(12) United States Patent
Kulesha

(10) Patent No.: US 8,490,362 B2
(45) Date of Patent: Jul. 23, 2013

(54) METHODS AND SYSTEMS FOR COMPOSITE STRUCTURAL TRUSS

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 979 days.

(21) Appl. No.: 11/697,162

(22) Filed: Apr. 5, 2007

(65) Prior Publication Data

US 2008/0245928 A1 Oct. 9, 2008

(51) Int. Cl.
*E04C 3/02* (2006.01)

(52) U.S. Cl.
USPC .................. 52/636; 52/84; 52/693; 52/696

(58) Field of Classification Search
USPC ............... 52/636, 634, 633, 690, 693, 695, 52/696, 84; 244/123.1
See application file for complete search history.

(56) References Cited

U.S. PATENT DOCUMENTS

| | | | | |
|---|---|---|---|---|
| 582,527 A | | 5/1897 | Golden | |
| 1,343,707 A | * | 6/1920 | Carns | 244/123.8 |
| 1,372,478 A | * | 3/1921 | Bradley | 244/117 R |
| 1,429,600 A | | 9/1922 | Lundin | |
| 1,571,239 A | * | 2/1926 | Dornier | 52/636 |
| 1,682,202 A | * | 8/1928 | Vaughn | 52/636 |
| 1,706,996 A | * | 3/1929 | Carns | 52/636 |
| 1,769,005 A | * | 7/1930 | Dusen | 244/123.8 |
| 1,796,654 A | * | 3/1931 | Hermann | 244/123.1 |
| 1,840,643 A | * | 1/1932 | Stout | 244/123.1 |
| 2,029,645 A | * | 2/1936 | Waugh | 52/377 |
| 2,092,472 A | * | 9/1937 | Rafter | 52/634 |
| 2,097,597 A | * | 11/1937 | Pavlecka | 52/574 |
| 2,098,676 A | * | 11/1937 | Rafter | 52/636 |
| 2,102,095 A | * | 12/1937 | Salzman | 244/123.1 |
| 2,122,698 A | * | 7/1938 | Rafter | 52/636 |
| 2,129,624 A | * | 9/1938 | Rafter | 52/636 |
| 2,233,969 A | * | 3/1941 | Woods | 244/123.8 |
| 2,386,019 A | * | 10/1945 | Watter | 52/84 |
| 2,389,917 A | * | 11/1945 | Leisen | 244/123.2 |
| 2,392,818 A | * | 1/1946 | Grafman | 52/636 |
| 2,396,625 A | * | 3/1946 | Watter | 244/123.1 |
| 2,514,607 A | * | 7/1950 | McLean | 52/692 |
| 2,589,193 A | | 3/1952 | Mayne | |
| 3,901,465 A | | 8/1975 | DeAngelis | |
| 3,973,766 A | | 8/1976 | Heath | |

(Continued)

OTHER PUBLICATIONS http://dictionary.reference.com/browse/bonded.*

(Continued)

*Primary Examiner* — Brian Glessner
*Assistant Examiner* — Adriana Figueroa
(74) *Attorney, Agent, or Firm* — Armstrong Teasdale LLP

(57) ABSTRACT

Methods and structures for a composite truss structure are provided. The structure includes a web formed of a plurality of sheets of composite material, each sheet including a first face and an opposing second face and each face including a length and a width. Each of the plurality of sheets are coupled to at least one other of the plurality of sheets face to face such that the length and width of each face substantially match the length and width of a face of an adjacent sheet. The plurality of sheets are formed to include an upper chord member, a lower chord member, and a plurality of web members extending therebetween. The structure also includes at least a first flange plate coupled to the web proximate an outer periphery of the web.

7 Claims, 6 Drawing Sheets

U.S. PATENT DOCUMENTS

| | | | |
|---|---|---|---|
| 4,051,289 A | 9/1977 | Adamson | |
| 4,078,352 A | 3/1978 | Knowles | |
| 4,120,065 A | 10/1978 | Sivachenko et al. | |
| 4,223,053 A | 9/1980 | Brogan | |
| 4,481,703 A | 11/1984 | Scott | |
| 4,671,470 A | 6/1987 | Jonas | |
| 4,887,406 A * | 12/1989 | Saia | 52/694 |
| 5,100,713 A * | 3/1992 | Homma et al. | 428/102 |
| 5,332,178 A | 7/1994 | Williams | |
| 5,499,782 A | 3/1996 | Domine | |
| 5,499,904 A | 3/1996 | Wallace et al. | |
| 5,527,625 A * | 6/1996 | Bodnar | 428/595 |
| 5,632,940 A | 5/1997 | Whatley | |
| 5,993,941 A | 11/1999 | Vasiliev et al. | |
| 6,427,945 B1 | 8/2002 | Bansemir | |
| 6,502,788 B2 | 1/2003 | Noda et al. | |
| 6,561,459 B2 | 5/2003 | Amaoka et al. | |
| 6,638,466 B1 | 10/2003 | Abbott | |
| 6,655,633 B1 | 12/2003 | Chapman, Jr. | |
| 6,889,937 B2 | 5/2005 | Simpson et al. | |
| 6,945,727 B2 | 9/2005 | Christman et al. | |
| 7,387,277 B2 * | 6/2008 | Kordel et al. | 244/123.5 |
| 7,575,194 B2 | 8/2009 | Brown et al. | |
| 7,587,877 B2 * | 9/2009 | Strickland et al. | 52/837 |
| 2003/0173460 A1 | 9/2003 | Chapman, Jr. | |
| 2004/0079838 A1 | 4/2004 | Simpson et al. | |
| 2004/0191441 A1 | 9/2004 | Bureau et al. | |
| 2005/0229523 A1 * | 10/2005 | Bodnar | 52/481.1 |
| 2006/0032702 A1 | 2/2006 | Linsmeier et al. | |

OTHER PUBLICATIONS

MIRA Flies High Using Composite Wing Ribs; SAE-UK.org Winter 2006 Issue; 3 pages.

Black, S.; Composite Rib Structure for Airbus A380 Vertical Tail; Mar. 2004; 4 pages.

Halme, J.; Development Testing of a Composite Wing Rib; Abstract of the Master's Thesis; May 6, 2002; Helsinki University of Technology; 134 pages.

International Search Report of PCT/US2008/058799; Sep. 17, 2009; 14 pages.

Raju, J. et al.; Advanced Composites: The Balance Between Performance and Cost; Composite Wing Rib Development in Australia; Apr. 3, 2003; Proceedings of the 24th International SAMPE Europe Conference of the Society of Advancement of Materials and Process Engineering; Paris Expo Porte de Versailles, Paris; pp. 425-432.

Toropov, V. et al.; Weight and Manufacturability Optimization of Composite Aircraft Components Based on a Genetic Algorithm; 6th World Congress of Structural and Multidisciplinary Optimization; May 30, 2005; Brazil; 7 pages.

Ruchin, P. et al.; Stress Concentration and Stability Studies in Composite Ribs with Flanged Cutouts; 2001 World Msc. Aerospace Conference; Sep. 24, 2001; No. 2001-136; Tollhouse, France; pp. 1-13.

Nino, G.F. et al.; Design and Manufacturing of Thermoplastic Composite Ribs Based on Finite Element Analysis; 49th AIAA/ASME/AHS/ASC Structures, Structural Dynamics and Materials Conference and Exhibit; Apr. 11, 2008; vol. 49th, No. 2250; pp. 1-10.

* cited by examiner

SECTION A - A

SECTION B - B

SECTION C - C

SECTION D - D

SECTION E - E

METHODS AND SYSTEMS FOR COMPOSITE STRUCTURAL TRUSS

BACKGROUND

Embodiments of the disclosure relate generally to methods and structures for forming lightweight truss members and more particularly, to methods and structures for forming composite wing ribs and truss members.

Conventional aircraft wing construction generally comprises one or more spars that extend laterally relative to the longitudinal axis of the fuselage to support a plurality of longitudinally extending laterally spaced ribs that define the shape of the air foil. Vertical web portions of the ribs include structural elements configured to carry compressive and tensile loads to maintain the airfoil shape. A truss design for aircraft wing ribs is an efficient method of transferring and distributing loads throughout the wing structure. Additionally truss structures are used for bridges, floors and other supporting structures. At least some known truss structures are heavy due to the use of metal components and structural elements of the truss structure. A lightweight material may be used to make strong lightweight truss structures however, current composite ribs are complicated to manufacture and generally heavy in order to provide sufficient load transfer between the truss structural elements. The assembly of aircraft wings utilizing composite ribs in the wing have also proven to be difficult.

What are needed are methods and structures for providing lightweight support structures that facilitate fabrication of the truss structures and connecting components and reduce assembly time.

SUMMARY

In one embodiment, a structure for a composite truss includes a web formed of a plurality of sheets of composite material, each sheet including a first face and an opposing second face and each face including a length and a width. Each of the plurality of sheets are coupled to at least one other of the plurality of sheets face to face such that the length and width of each face substantially match the length and width of a face of an adjacent sheet. The plurality of sheets are formed to include an upper chord member, a lower chord member, and a plurality of web members extending therebetween. The structure also includes at least a first flange plate coupled to the web proximate an outer periphery of the web.

In yet another embodiment, a method of forming a composite structural member includes coupling a plurality of sheets of composite material face to face to form a web, shaping the web to form an upper cord and a lower chord, and forming a plurality of openings in the web to form a plurality of structural web members extending between the upper cord and lower chord. The method also includes coupling at least one flange plate to an outer peripheral edge of at least one of the upper cord and the lower chord.

In another embodiment, a method of forming an aircraft wing including a composite wing rib includes forming a wing rib wherein forming the wing rib includes forming a web from a plurality of composite sheets coupled together in a face to face orientation, forming a plurality of interconnected structural elements in the web including an upper chord member, a lower chord member, and a plurality of web members each defined by a plurality of openings formed in the web, and coupling a flange plate to a side of the wing rib proximate an outer peripheral edge of the wing rib, the flange plate including a laterally extending flange member. The method further includes assembling at least one wing rib to at least one of a forward spar and an aft spar and assembling a trailing edge skin to the spar and wing rib assembly using the laterally extending flange member. The method also includes assembling an upper and a lower center skin to the rib, spar and trailing edge skin assembly such that the center skin overlaps the trailing edge skin and attaching the leading edge skin to the wing assembly such that the leading edge skin overlaps the center skin and trailing edge skin assembly.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 1:
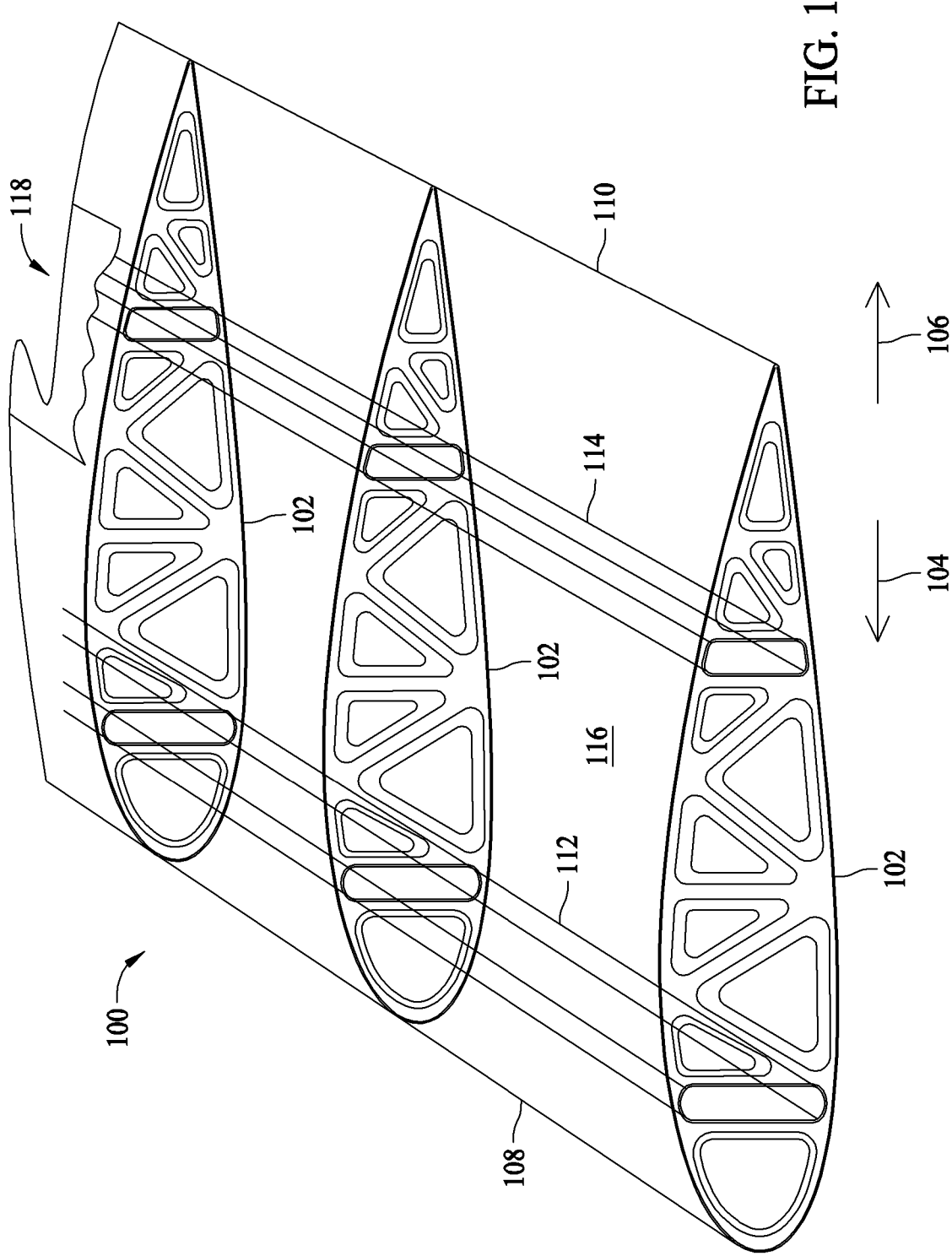
FIG. 1 is a cut-away isometric view of an aircraft wing structure in accordance with an embodiment of the disclosure.

FIG. 1 is a cut-away isometric view of an aircraft wing structure 100 in accordance with an embodiment of the disclosure. In the exemplary embodiment, aircraft wing structure 100 includes a plurality of truss rib assemblies 102 extending in a forward direction 104 and an aft direction 106 between a leading edge 108 and a trailing edge 110 of aircraft wing structure 100. Aircraft wing structure 100 also includes a forward wing spar 112 and an aft wing spar 114 extending from a fuselage of the aircraft (not shown). A lower wing covering section or skin 116 is joined to lower portions of truss rib assemblies 102 between leading edge 108 and trailing edge 110. Similarly, an upper wing covering section or skin 118 is bonded to upper portions of truss ribs 102 between leading edge 108 and trailing edge 110.

Figure 2:
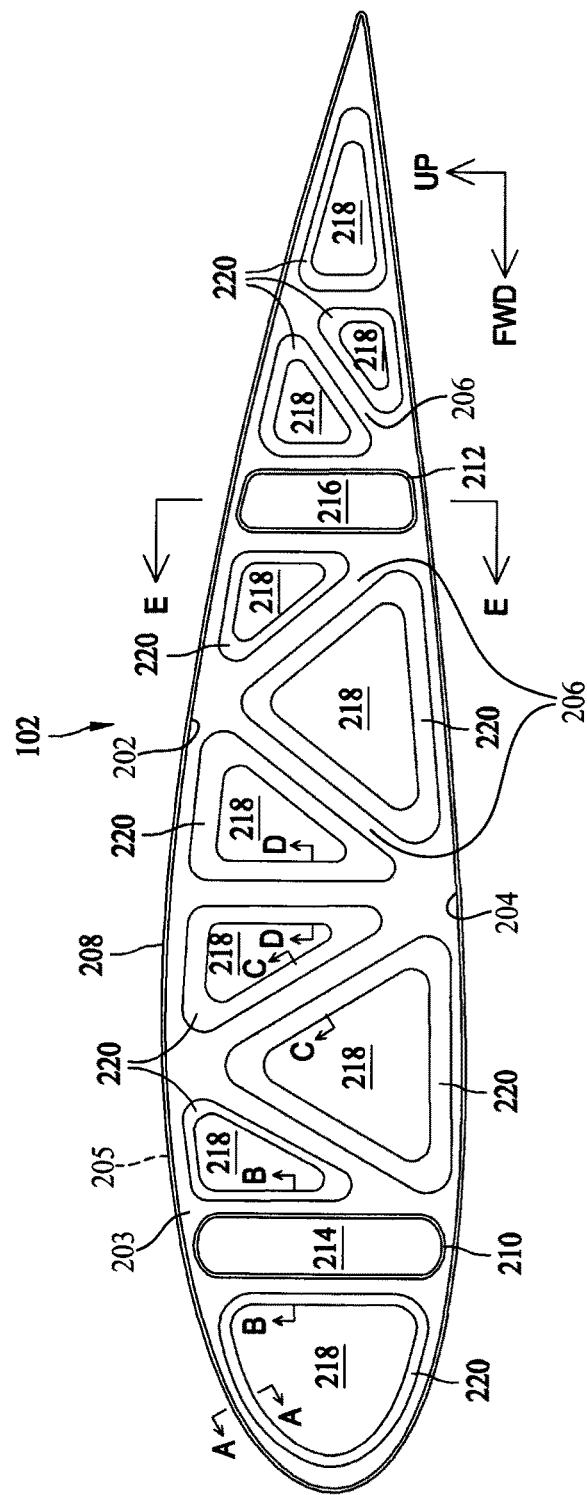
FIG. 2 is a side cross-sectional view of a truss rib assembly in accordance with an exemplary embodiment of the disclosure.

FIG. 2 is a side cross-sectional view of a truss rib assembly 102 in accordance with an exemplary embodiment of the disclosure. Although described as a rib for an aircraft airfoil such as a wing, it should be understood that the structures and methods of fabricating such structures may be used for other composite truss structures, for example, but not limited to joists, roof trusses, and bridge deck support members. In such embodiments, truss rib assemblies 102 are configured to receive one or more decking members for supporting the decking member thereon.

In the exemplary embodiment, truss rib assembly 102 comprises a composite truss structure. Truss rib assembly 102 includes an upper chord member 202, a lower chord member, 204, and a plurality of web members 206 extending therebetween. Each of upper chord member 202, lower chord member, 204, and web members 206 are formed of at least a first portion 203 and a second portion 205 mounted side by side. Each portion is formed of a fiber reinforced sheet material such as but not limited to plain weave (PW) or 5-hardness (5H) material. Fiber reinforced materials such as fiber glass, graphite, aromatic polyamide, such as but not limited to Aramid fiber epoxies or thermoplastics may also be used. Each portion is bonded or consolidated together. After the portions are bonded or consolidated together all of the truss structural elements form a box structure for each structural element. A cap of the rib is open and becomes closed when the wing skin is bonded to the rib. A foam core may be utilized in the hollow spaces of the rib or truss.

Figure 3:
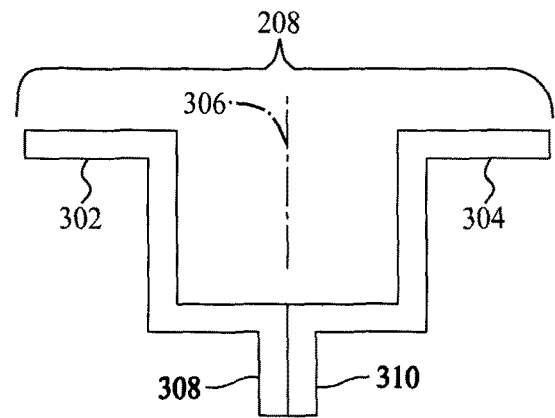
FIG. 3 is a section view of the truss rib assembly shown in FIG. 2 taken along section lines A-A.

In the exemplary embodiment, truss rib assembly 102 is formed to include a lateral flange assembly that is coupled to forms an outer periphery of truss rib assembly 102 that extends by extending laterally away from truss rib assembly 102. This lateral flange 208 is shown in FIG. 3. Lateral flange 208 may have a right hand portion and a left hand portion that each extend away from each other. In other embodiments, only a right hand or left hand flange is used. In the exemplary embodiment, flange 208 extends about the entire periphery of truss rib assembly 102. In an alternative embodiment, truss rib assembly 102 flange 208 only extends about a portion of the periphery of truss rib assembly 102. Referring again to FIG. 2, a forward spar flange 210 and an aft spar flange 212 are formed similarly to lateral flange 208, but circumscribe an inner periphery of each spar opening, 214 and 216 respectively. Flange 208, 210, 212 illustrated at the spar and cap locations is configured to bond the rib and or rib sections to the individual skins to form skin assemblies. Flanges 210 and 212 are configured to bond the subassemblies into a completed wing. Each web opening 218 is circumscribed by a respective right hand and/or left hand flange 220, formed in truss rib assembly 102, that extends inwardly into web opening 218 to also form face places as shown in FIGS. 3-6.

Although truss rib assembly 102 is illustrated as being fabricated as a unitary truss rib assembly 102, it should be understood that truss rib assembly 102 may be fabricated from more that one separate piece to facilitate different wing assembly methods. The use of such composite truss ribs are not limited to aircraft wings, but also to floor or roof trusses on buildings, and bridge trusses that are manufactured in different locations and are erected on site.

FIG. 3 is a section view of truss rib assembly 102 taken along section lines A-A (shown in FIG. 2). In the exemplary embodiment, truss rib assembly 102 is formed by one or more sheets of composite material cutout to form upper chord member 202, lower chord member, 204, the flange 208 that corresponds to members 202 and 204, web members 206, and flanges 210 and 212. The sheets are bonded together side by side forming flange 208 about the periphery of truss rib assembly 102. Similar flanges and therefore faces, are formed about openings 218. The flange at section A-A includes a left hand lateral portion 302 and a right hand lateral portion 304 each extending away from a centerline 306 of the composite sheets. The flange also includes a left hand flange portion 308 that extends into opening 218 and a right hand flange portion 310 that is complementary to left hand flange portion 308. In the exemplary embodiment, left hand flange portion 308 and right hand flange portion 310 are co-bonded to facilitate coupling the composite sheets together. Left hand lateral portion 302 and a right hand lateral portion 304 are configured to receive skin members in a bonding relationship to facilitate assembling a wing structure.

Figure 4:
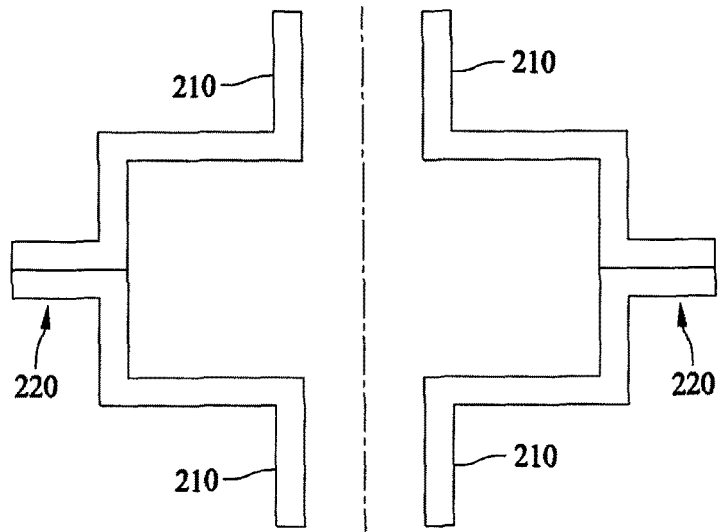
FIG. 4 is a section view of the truss rib assembly shown in FIG. 2 taken along section lines B-B.

FIG. 4 is a section view of truss rib assembly 102 taken along section lines B-B (shown in FIG. 2). In the exemplary embodiment, truss rib assembly 102 taken along section lines B-B includes forward spar flange 210 on both sides of forward spar opening 214 and flanges 220 that extend into openings 218 and that facilitate coupling the composite sheets together.

Figure 5:
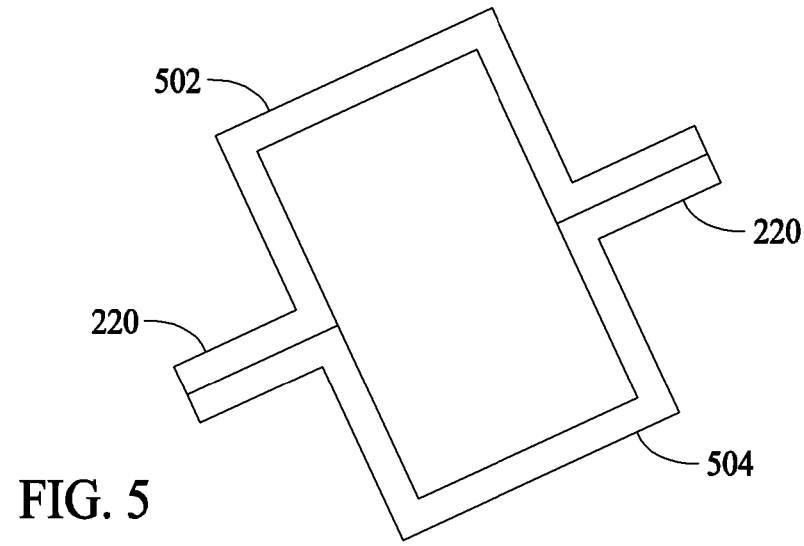
FIG. 5 is a section view of the truss rib assembly shown in FIG. 2 taken along section lines C-C.

FIG. 5 is a section view of truss rib assembly 102 taken along section lines C-C (shown in FIG. 2). In the exemplary embodiment, truss rib assembly 102 taken along section lines C-C includes a left hand flange half 502 and a right hand flange half 504 and flanges 220 that extend into openings 218 and that facilitate coupling the composite sheets together.

Figure 6:
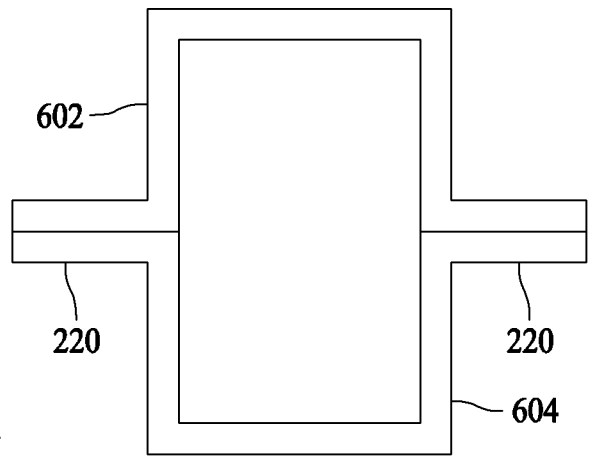
FIG. 6 is a section view of the truss rib assembly shown in FIG. 2 taken along section lines D-D.

FIG. 6 is a section view of truss rib assembly 102 taken along section lines D-D (shown in FIG. 2). In the exemplary embodiment, truss rib assembly 102 taken along section lines D-D includes a left hand flange half 602 and a right hand flange half 604 and flanges 220 that extend into openings 218 and that facilitate coupling the composite sheets together.

Figure 7:
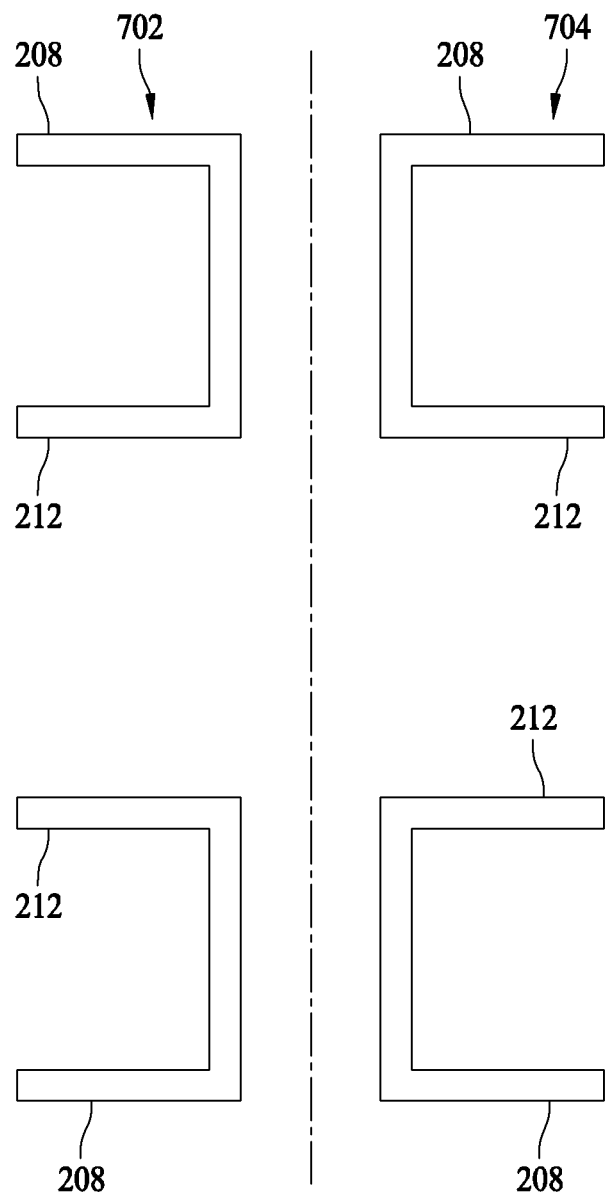
FIG. 7 is a section view of the truss rib assembly shown in FIG. 2 taken along section lines E-E.

FIG. 7 is a section view of truss rib assembly 102 taken along section lines E-E (shown in FIG. 2). In the exemplary embodiment, truss rib assembly 102 taken along section lines E-E includes aft spar flange 212 on both sides of aft spar opening 216 and on each of a left hand flange 702 and a right flange 704. Truss rib assembly 102 also includes lateral flange 208 that extends along upper chord member 202 and lower chord member 204. Aft spar flange 212 facilitates coupling truss rib assembly 102 to aft spar 114 and lateral flange 208 facilitates coupling covering sections or skin members to truss rib assembly 102 during assembly.

Figure 8:
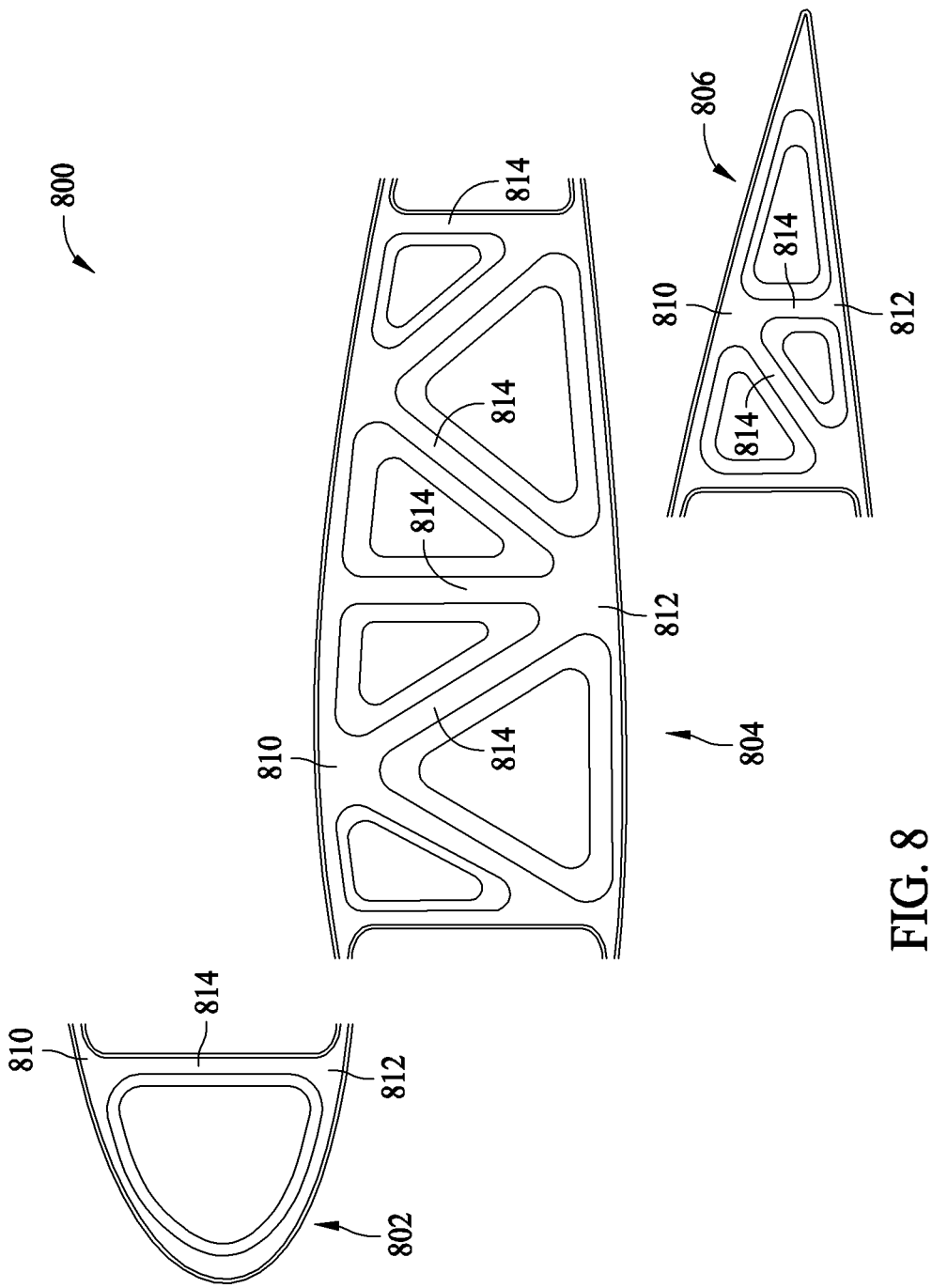
FIG. 8 is a side cross-sectional view of a truss rib assembly in accordance with another exemplary embodiment of the disclosure.

FIG. 8 is a side cross-sectional view of a truss rib assembly 800 in accordance with another exemplary embodiment of the disclosure. In the exemplary embodiment, truss rib assembly 800 is fabricated in three portions, a forward portion 802, a center portion 804, and an aft portion 806. Each portion is formed of a composite sheet material such as PW or 5H material or a continuous fiber wound in channels oriented in a pattern representing a respective portion of an upper chord 810, a lower chord 812, and interconnecting structural members 814 forming the truss web. In some embodiments, it may be advantageous to form one or more of forward portion 802, a center portion 804, and an aft portion 806 of sheet material while other portions are formed of placed fib fabricated material. Assembly is accomplished by joining forward portion 802, a center portion 804, and an aft portion 806. In one embodiment, forward portion 802 and center portion 804 are assembled to a forward spar (not shown) prior to being joined to each other and center portion 504 and an aft portion 506 are assembled to a rear spar (not shown) prior to being joined to each other.

The above-described methods of forming composite structural members and composite truss structures formed thereby are cost-effective and highly reliable. The methods and structures include composite sheet material formed and bonded together in a truss that includes an upper and lower chord as well as a web containing plurality of structural truss elements. The truss includes flange members for facilitating stiffening the truss and attaching skin or decking to the truss members. The composite sheet material is bonded or consolidated together to facilitates providing strength and stability. The lightweight truss simplifies handling with less or smaller support equipment. Accordingly, the methods and structures facilitate reducing weight and fabrication time, and improving strength and stiffness of the structural member in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A truss comprising:
   a first composite plate structure; and
   a second composite plate structure coupled directly to said first composite plate structure to form said truss, wherein each of said first and second composite plate structures comprises:
      an upper chord member;
      a lower chord member;
      a plurality of web members extending between said upper and lower chord members to form at least a portion of an aircraft wing rib; and
      a first flange plate formed about an opening defined by at least one portion of said web members and extending perpendicular to said web members, wherein said plurality of web members comprises at least one web member extending obliquely between said upper chord member and said lower chord member, and wherein the opening receives an aft wing spar;
   wherein said first composite plate structure first flange plate and said second composite plate structure first flange plate extend away from one another and are separated from one another by a gap.

2. A truss in accordance with claim 1 wherein each of said first and second composite plate structures further comprises:
   a second flange plate wherein said first flange plate and said second flange plate are oriented such that at least one of said plurality of web members is located therebetween.

3. A truss in accordance with claim 2, wherein at least a portion of said second flange plate extends substantially perpendicular from said plurality of web members.

4. A truss in accordance with claim 1 wherein each of said first and second composite plate structures is formed from a plurality of sheets of a composite material, wherein said composited material is at least one of a plain weave composite material and a 5 hardness composite material.

5. A truss in accordance with claim 1 wherein said plurality of web members further comprise at least one of a vertical web member and a horizontal web member.

6. A truss in accordance with claim 1, wherein said first composite plate structure and said second composite plate structure are oriented with respect to one another such that upon coupling, said truss comprises an aircraft wing truss rib assembly.

7. A truss in accordance with claim 1, wherein the opening in each of said first and second plate composite structures is defined by vertical web members of said plurality of web members.

* * * * *